United States Patent
Ramakrishnan et al.

(10) Patent No.: US 10,235,482 B1
(45) Date of Patent: Mar. 19, 2019

(54) EXHAUSTIVE INPUT VECTOR STIMULI FOR SIGNAL ELECTROMIGRATION ANALYSIS

(71) Applicant: Cadence Design Systems, Inc., San Jose, CA (US)

(72) Inventors: Aswin Ramakrishnan, El Cerrito, CA (US); Jalal Wehbeh, Sunnyvale, CA (US); Robert MacDonald, Austin, TX (US); Federico Politi, Menlo Park, CA (US); Ajish Thomas, San Jose, CA (US)

(73) Assignee: CADENCE DESIGN SYSTEMS, INC., San Jose, CA (US)

( * ) Notice: Subject to any disclaimer, the term of this patent is extended or adjusted under 35 U.S.C. 154(b) by 0 days.

(21) Appl. No.: 15/470,712

(22) Filed: Mar. 27, 2017

(51) Int. Cl.
*G06F 17/50* (2006.01)

(52) U.S. Cl.
CPC ...... *G06F 17/5022* (2013.01); *G06F 17/5036* (2013.01); *G06F 17/5081* (2013.01); *G06F 2217/76* (2013.01)

(58) Field of Classification Search
CPC .................. G06F 17/5022; G06F 17/5036
USPC ....................................................... 716/115
See application file for complete search history.

(56) References Cited

U.S. PATENT DOCUMENTS

| | | | |
|---|---|---|---|
| 6,842,727 B1* | 1/2005 | Hayashi | G06F 17/5036 345/440 |
| 9,043,771 B1 | 5/2015 | Vardhan et al. | |
| 9,135,269 B2 | 9/2015 | Shetty et al. | |
| 2004/0243376 A1* | 12/2004 | Karunaratne | G06F 17/5022 703/18 |
| 2013/0055184 A1* | 2/2013 | Shroff | G06F 17/5081 716/112 |
| 2013/0060657 A1 | 3/2013 | Kudva et al. | |
| 2017/0255732 A1* | 9/2017 | Milor | G06F 17/5022 |
| 2018/0195346 A1* | 7/2018 | Bulloch | E21B 29/06 |

* cited by examiner

*Primary Examiner* — Suchin Parihar
(74) *Attorney, Agent, or Firm* — McDermott Will & Emery LLP

(57) ABSTRACT

A method for obtaining a partition netlist from a partition of an integrated circuit netlist and identifying a logic path from an input to an output in the partition netlist is provided. The method includes identifying a first delay arc for the logic path including circuit components from the partition netlist, and configuring a first input stimulus vector to invert the input in the partition netlist and to induce a current through at least one of the plurality of circuit components. When a second input stimulus vector is associated with a second delay arc that is equivalent to the first delay arc in the logic path, the method includes selecting one of the first or second input stimulus vectors for a set of input stimuli vectors. The method further includes determining an electromigration effect on the partition netlist with the input stimuli vectors.

20 Claims, 8 Drawing Sheets

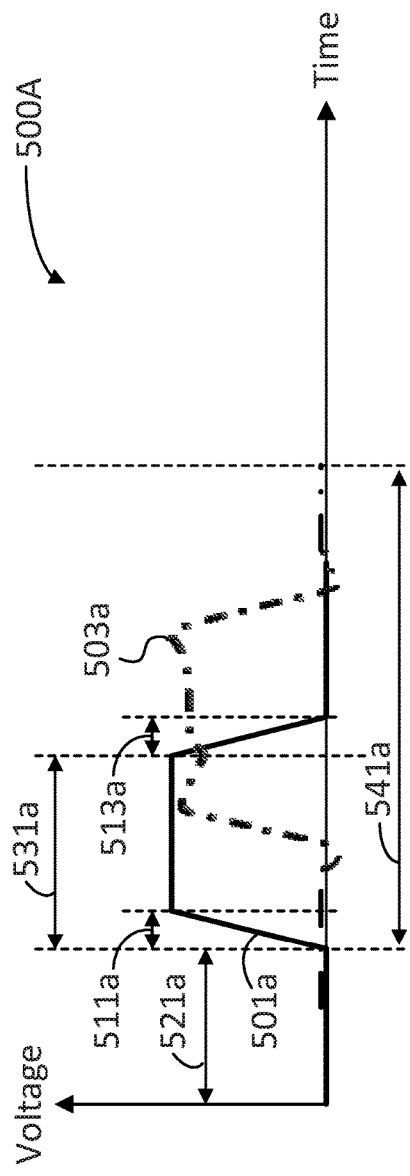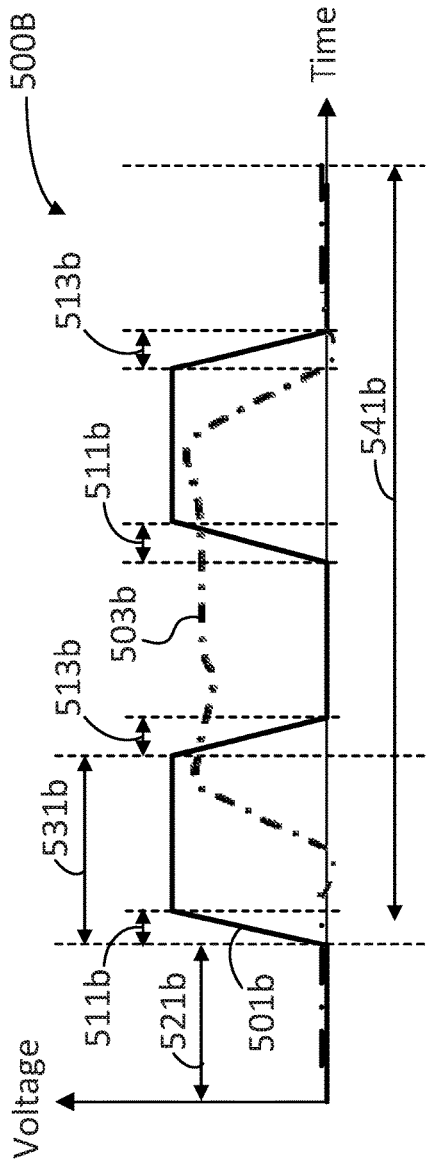

EXHAUSTIVE INPUT VECTOR STIMULI FOR SIGNAL ELECTROMIGRATION ANALYSIS

TECHNICAL FIELD

Embodiments described herein are generally related to the field of circuit simulation in circuit modeling and fabrication. More specifically, embodiments described herein are related to selecting an input vector stimuli set for efficient signal electromigration analysis of an integrated circuit.

BACKGROUND

Signal electromigration (SEM) is a phenomenon that causes wires and other circuit elements to deteriorate with usage as current flows through them. Current circuit models include large numbers of components arranged in ever-smaller dimensions, requiring small wires and resistors to withstand large current densities, thereby enhancing the deleterious effects of SEM. Given the possible large sizes of simulations and simulation tasks for complex circuits including billions of components in a single chip, integrated circuit models simplify the assumptions of signal flow in a circuit, thereby generally overestimating SEM effects. This results in modeling decisions such as reducing component density and the like, which ultimately reduce the cost efficiency of circuit fabrication. Furthermore, oversimplification may result in overlooking certain signal combinations that may occur during circuit operation, which may result in catastrophic circuit failure, forcing a complete re-design of a circuit. Such an outcome is highly undesirable, at least because of the large cost of retooling manufacturing protocols at the foundry level as well as the missed market window opportunity cost.

The description provided in the background section should not be assumed to be prior art merely because it is mentioned in or associated with the background section. The background section may include information that describes one or more aspects of the subject technology.

SUMMARY

In a first embodiment, a computer-implemented method is described that includes obtaining a partition netlist from a partition of an integrated circuit netlist and identifying a logic path from an input of the partition netlist to an output of the partition netlist. The computer-implemented method includes identifying a first delay arc for the logic path, the first delay arc including a plurality of circuit components from the partition netlist, and configuring a first input stimulus vector to invert the input in the partition netlist and to induce a current through at least one of the plurality of circuit components. When a second input stimulus vector is associated with a second delay arc that is equivalent to the first delay arc in the logic path, the method includes selecting one of the first or second input stimulus vectors for a set of input stimuli vectors. The method further includes determining an electromigration effect on the partition netlist with the set of input stimuli vectors.

In a second embodiment, a system is described that includes a memory, storing instructions, and at least one processor that executes the instructions to obtain a partition netlist from a partition of an integrated circuit netlist. The processor further executes the instructions to identify a logic path from an input of the partition netlist to an output of the partition netlist, identify a first delay arc for the logic path, the first delay arc including a plurality of circuit components from the partition netlist, and to configure a first input stimulus vector to invert the input in the partition netlist and to induce a current through at least one of the plurality of circuit components. When a second input stimulus vector is associated with a second delay arc that is equivalent to the first delay arc in the logic path, the processor executes instructions to select one of the first or second input stimulus vectors for a set of input stimuli vectors. The processor also executes instructions to determine an electromigration effect on the partition netlist with the set of input stimuli vectors.

In yet another embodiment, a non-transitory, machine-readable storage medium is described that includes machine-readable instructions for causing a processor to execute a method for obtaining a partition netlist from a partition of an integrated circuit netlist and identifying a logic path from an input of the partition netlist to an output of the partition netlist. The method further includes identifying a first delay arc for the logic path, the first delay arc including a plurality of circuit components from the partition netlist, and configuring a first input stimulus vector to invert the input in the partition netlist and to induce a current through at least one of the plurality of circuit components. When a second input stimulus vector is associated with a second delay arc that is equivalent to the first delay arc in the logic path, the method includes selecting one of the first or second input stimulus vectors for a set of input stimuli vectors. The method further includes determining an electromigration effect on the partition netlist with the set of input stimuli vectors.

In a further embodiment, a system is described that includes a means for storing instructions and a means to execute the instructions to perform steps to obtain a partition netlist from a partition of an integrated circuit netlist, to identify a logic path from an input of the partition list to an output of the partition netlist, and to identify a first delay arc for the logic path, the first delay arc including a plurality of circuit components from the partition netlist. The means to execute the instructions further configures a first input stimulus vector to invert the input in the partition netlist and induces a current through at least one of the plurality of circuit components. When a second input stimulus vector is associated with a second delay arc that is equivalent to the first delay arc in the logic path, the means to execute the instructions selects one of the first or second input stimulus vectors for a set of input stimuli vectors. The means to execute the instructions also determines an electromigration effect on the partition netlist with the set of input stimuli vectors.

BRIEF DESCRIPTION OF THE DRAWINGS

The accompanying drawings, which are included to provide further understanding and are incorporated in and constitute a part of this specification, illustrate disclosed embodiments, and together with the description serve to explain the principles of the disclosed embodiments. In the drawings:

FIG. 5A illustrates an input vector stimulus in a combination cell configuration, according to some embodiments.

FIG. 5B illustrates an input vector stimulus in a sequential cell configuration, according to some embodiments.

Figure 1:
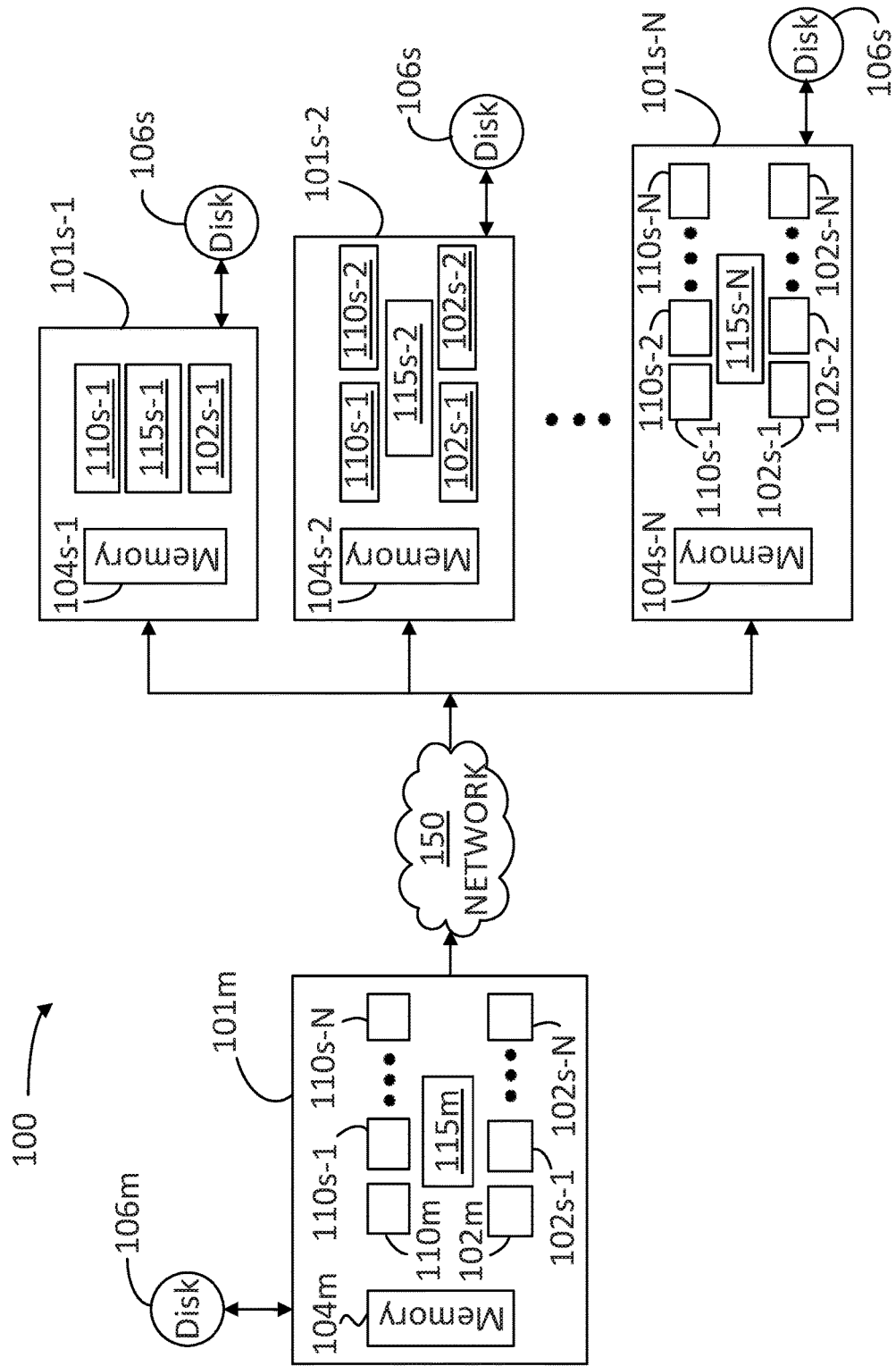
FIG. 1 is a block diagram of a cloud environment for integrated circuit (IC) modeling and characterization, according to some embodiments.

In the figures, elements and steps denoted by the same or similar reference numerals are associated with the same or similar elements and steps, unless indicated otherwise. In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

General Overview

The disclosed system provides a method for partitioning a large circuit model for signal electromigration analysis to provide a computationally efficient and more accurate circuit emulation.

The disclosed system addresses a technical problem tied to computer technology and arising in the realm of computer networks, namely the technical problem of efficient usage of multiple computer processing resources in a cloud environment for the purpose of obtaining a detailed integrated circuit modeling. The disclosed system solves this problem by partitioning a large circuit model into multiple, smaller circuit partitions that can be modeled efficiently using limited computational resources distributed in a network. For example, in some embodiments the limited computational resources include multiple servers forming the nodes of a network in a cloud environment. The system then re-groups the multiple resulting files from each circuit partition into an emulation file representing SEM effects for the entire circuit. Such an approach reduces the computational burden for each single server in a network node, increases the emulation speed of the large circuit model (e.g., in terms of CPU hour usage), and enables a more refined analysis of the large circuit model. A more refined analysis of an integrated circuit model may enable the identification of "critical paths" where performance is heavily dependent on the specific characteristic of circuit components along the critical path.

Embodiments of methods and systems as disclosed herein include static partitioning schemes having no inputs from the user. Some embodiments further include dynamic partitioning schemes including user inputs (e.g., slew rate, frequency, and the like). In embodiments as disclosed herein, an IC model is represented by an IC netlist including circuit components and the wires connecting them. The IC netlist may include a graphical layout of the circuit and associated files including specifications for each of the circuit components and wires. In a dynamic partitioning scheme, the IC netlist may be partitioned differently depending on the user inputs. Each of the resulting partitions may use inputs and outputs from other circuits and other partitions as well. Once the partitioning is accomplished, an electromagnetic simulation for each partition is performed in a parallel computation scheme, such as encountered in cloud environments. Accordingly, a plurality of servers (e.g., master and slave servers) coupled through a network is configured to generate, share where desirable, and apply stimulus vectors to create appropriate current flows and identify electromigration effects in each of the partitions.

Embodiments as disclosed herein include different stimuli inducing currents flowing in either direction through at least some circuit elements, thereby reducing some of the deleterious effects of SEM. Accordingly, embodiments as disclosed herein avoid overestimating circuit failure, which causes overdesigning.

FIG. 1 is a block diagram of a cloud environment 100 for IC modeling and characterization, according to some embodiments. Cloud environment 100 may be a massive parallel architecture of computer servers including a master server 101m and a plurality of slave servers 101s-1 through 101s-N (hereinafter collectively referred to as "slave servers 101s") coupled through a network 150, where N is an integer number. Hereinafter, master server 101m and slave servers 101s in cloud environment 100 will be collectively referred to as "servers 101." Network 150 can include, for example, any one or more of a personal area network (PAN), a local area network (LAN), a campus area network (CAN), a metropolitan area network (MAN), a wide area network (WAN), a broadband network (BBN), the Internet, and the like. Further, the network 150 can include, but is not limited to, for example, any one or more of the following network topologies, including a bus network, a star network, a ring network, a mesh network, a star-bus network, tree or hierarchical network, or the like.

Each of servers 101 includes a memory and an operating system. For example, master server 101m includes memory 104m and operating system 115m, and slave servers 101s include memories 104s-1 through 104s-N (hereinafter collectively referred to as "memories 104"). Master server 101m may also include operating system 115m, and slave servers 101s may include slave operating systems 115s-1 through 115s-N (hereinafter, collectively referred to as "operating systems 115"). Master server 101m may also include application 110m, and slave servers 101s may include slave applications 110s-1 through 110s-N (hereinafter, collectively referred to as instances of "application 110"). Slave applications 110s-1 through N include copies of master application software 110m. Master server 101m may keep separate mirror images of slave applications 110s, associated with independent portions of master memory 104m. Memories 104, application software 110 and operating systems 115 are configured to store commands to be executed by processors 102m and 102s-1 through 102s-N (hereinafter collectively referred to as "processors 102") to perform at least partially methods as disclosed herein. Servers 101 may be coupled with external disks to save and retrieve data, such as disk 106m for master server 101m, and disks 106s for slave servers 101s (hereinafter, collectively referred to as "disks 106").

Master application 110m is the main instance of application 110 and may be initially executed by a user having access to master server 101m (e.g., through network 150). Master application 110m is configured to instantiate and control execution of slave applications 110s. For example, in some embodiments master application 110m provides suitable initialization routines to place each of slave applications 110s in a desired state to start a simulation run, and provides suitable tasks for each of slave applications 110s. The tasks may correspond to sequences or computational threads separately performed by each of slave applications 110s. Further, master application 110m is configured to collect the computation results from each of slave applications 110s, when available. Note that, in the architecture of cloud environment 100, master server 101m has created two instances of slave application 110s-1 and 110s-2 in slave server 101s-2, and up to N instances of slave applications 110s-1 through 110s-N in slave server 101s-N. The multiple instances of slave applications 110s in each of slave servers 101s may be executed independently of one another. For example, slave servers 101s-1 through 101s-N may be configured to perform a first computational thread in slave application 110s-1, slave servers 101s-2 through 102s-N may be configured to perform a second computational thread in slave application 110s-2, and so on. The results and data for each of the tasks in the first, second, and other computational threads are communicated to and from master server 101m, through network 150, to each of the corresponding slave servers 101s. Moreover, in some embodiments slave servers 101s may communicate with each other through network 150 to share data and results within commonly executed computational threads. For example, slave server 101s-1 may communicate with slave server 101s-2 data associated with the first computational thread, and so on.

Figure 2:
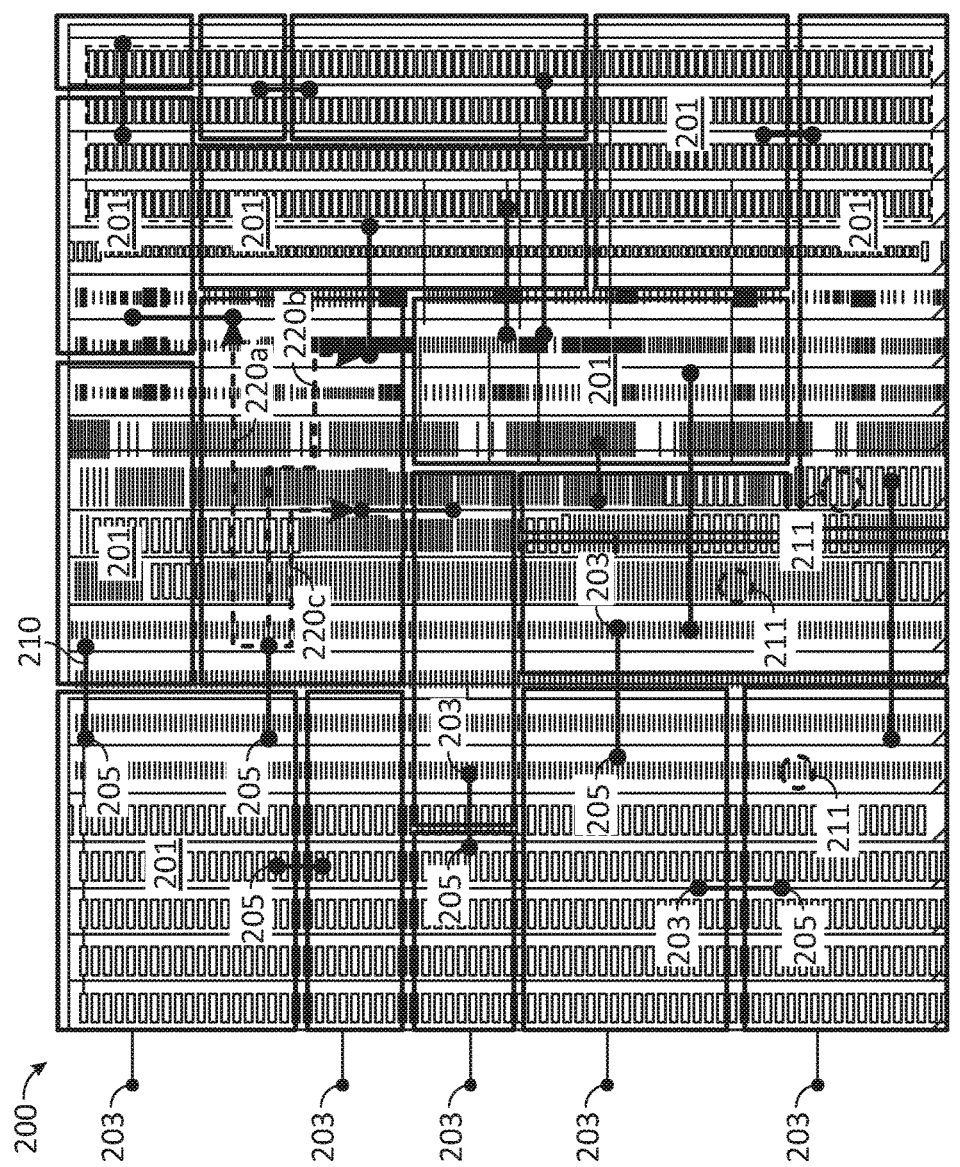
FIG. 2 illustrates partitions of an IC netlist for signal electromigration analysis, according to some embodiments.

FIG. 2 illustrates partitions 201 of an IC netlist 200 for signal electromigration analysis, according to some embodiments. IC netlist 200 represents an IC model including multiple components 211 that may include transistors, resistors, capacitors, inductors, and the wires coupling them. As a non-limiting example, components 211 may include metal-oxide-semiconductor (MOS) transistors such as N-type MOS (NMOS) transistors, P-type MOS (PMOS) transistors, field-effect transistors (FET), fin FET transistors (FinFET), and the like. Each partition 201 includes multiple components 211, at least one input 203 and at least one or more outputs 205. Input 203 may be coupled to an external signal, or to a signal provided by output 205 from another partition 201. In some embodiments, partitions 201 that are non-adjacent may also be coupled through wires 210 in an output/input configuration. In some embodiments, partitioning of IC netlist 200 is performed so that input/output coupling between different partitions 201 through wires 210 occurs across adjacent partitions 201. Accordingly, it is desirable that wires 210 coupling different partitions 201 be shortened to avoid undue time-lag, loss, capacitive effects and other undesirable effects that reduce signal performance. By reducing deleterious effects in signal performance, overall current intensity through wires 210 is desirably kept at lower values, thus reducing the intensity of SEM effects in the IC model.

Each partition 201 further includes at least one signal path 220a, 220b, or 220c (hereinafter, collectively referred to as signal paths 220) joining an input 203 to an output 205. Signal paths 220 couple multiple circuit elements sequentially in time and may be logically independent from one another. In some embodiments, signal paths 220 may have a degree of logical coupling, forming a tree wherein a trunk may branch out into multiple signal paths within partition 201. In some embodiments, multiple signal paths may converge into a single path leading into an output 205. Convergence of multiple signal paths 220, or branching out of multiple signal paths 220 are features that may have an impact in SEM of the wires and other elements along signal paths 220. For example, configurations in which all converging signals in a tree include a "high" state ('1') tend to increase the current level in the converging signal path, thereby enhancing SEM effects at least for a period of time. In some embodiments, one of the signal paths (e.g, signal path 220b) may be designated as a "critical path," wherein the time it takes a signal to traverse partition 201 from input 203 to output 205 in path 220b is the longest for any of signal paths 220. A size of a partition 201 may be associated to the number of circuit elements (e.g., resistors, transistors, capacitors, inductors and the like) in the partition, the number of signal paths in the partition, the number of inputs 203 and outputs 205 in the partition, or the length (in time or in distance) of critical path 220b. Each signal path 220 may involve a separate simulation step.

Figure 3:
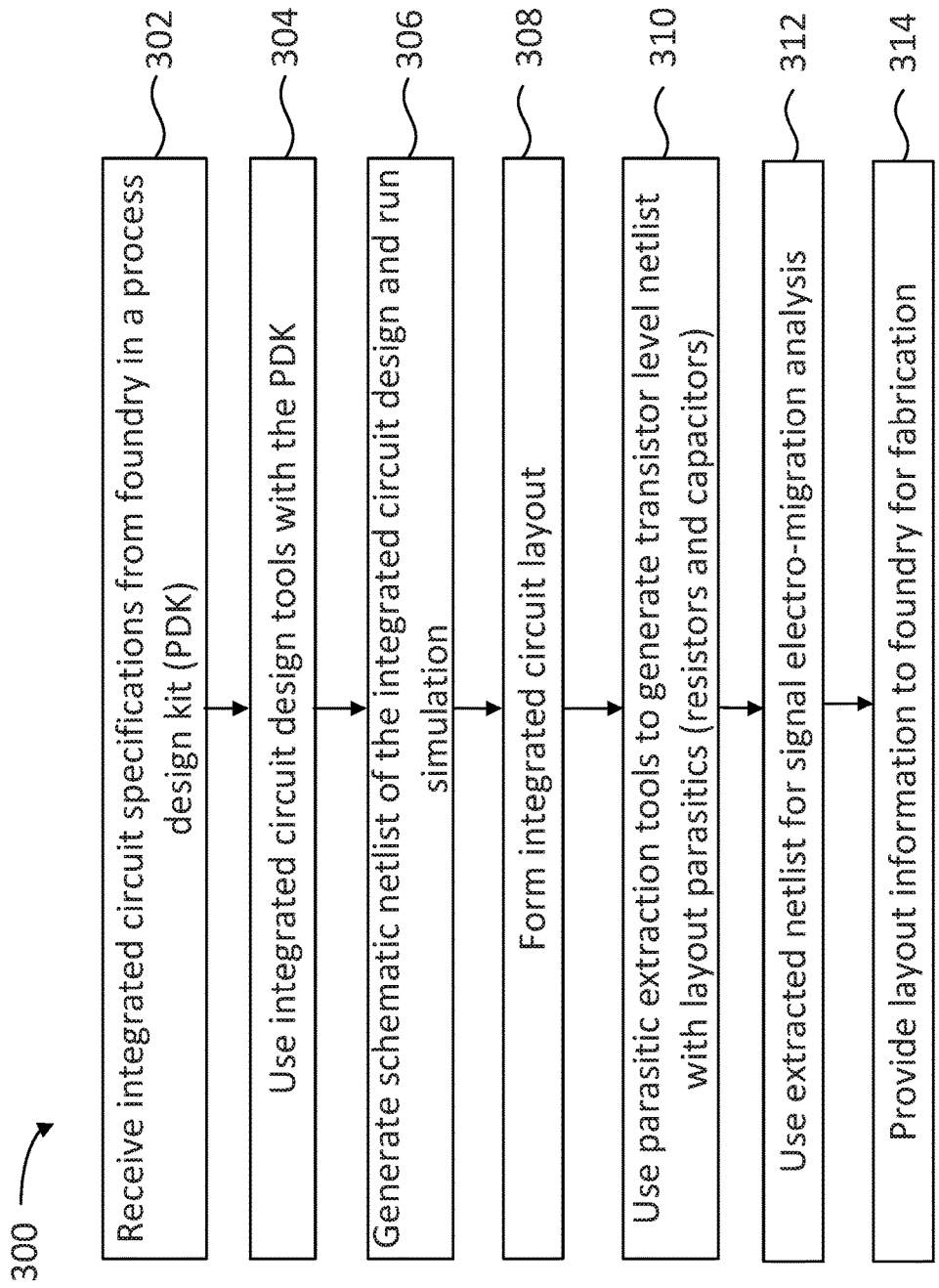
FIG. 3 is a flowchart including steps in a method for IC modeling and characterization according to some embodiments.

FIG. 3 illustrates a flowchart including steps in a method 300 for IC modeling and characterization according to some embodiments. At least some of the steps in method 300 may be performed by a computer having a processor executing commands stored in a memory of the computer. Further, steps as disclosed in method 300 may include retrieving, editing, and/or storing files in a database that is part of, or is communicably coupled to, the computer. Methods consistent with the present disclosure may include at least some, but not all of the steps illustrated in method 300, performed in a different sequence. Furthermore, methods consistent with the present disclosure may include at least two or more steps as in method 300, performed overlapping in time, or almost simultaneously.

In some embodiments, at least one or more of the steps in method 300 may be performed in cloud computing environment 100, wherein the computer may include servers 101, such as a master server 101m and a slave servers 101s. Accordingly, at least some of the steps illustrated in method 300 may be performed in parallel in different processors 102, following separate computational threads. For example, each of the separate computational threads may be performed by at least one of slave servers 102s in each of the applications 110s and processors 102s dedicated to the specific computational thread.

In some embodiments, master processor 101m is configured to provide slave processor 101s with an initialization routine to perform at least one of the steps in method 300, and to control an execution of at least one of the steps in method 300 by slave processor 102s. Furthermore, a first processor 102 may partially perform at least one of the steps of method 300 in a first computational thread and a second processor 102 may partially perform at least a second one of the steps of method 300 in a second computational thread.

Step 302 includes receiving IC specifications from a foundry. In some embodiments, step 302 may include retrieving a "process development kit" (PDK) file from the foundry, wherein device specifications are listed as functions of independent random variables that a designer may use to develop statistical analysis of the IC performance.

Step 304 includes using IC design tools together with the PDK to generate an IC model. In some embodiments, step 304 includes selecting a characterization tool for the IC modeling task. In some embodiments, step 304 may include selecting a tool from a platform for characterizing multiple IC blocks such as standard cells, memories, mixed signal blocks for timing, variation, signal integrity, power and electro-migration, among other features of IC design.

Step 306 includes generating a schematic netlist of the integrated circuit design and running a simulation of the schematic netlist. In some embodiments, step 306 includes generating an IC model as IC netlist 200. In some embodiments, step 306 includes generating a register transfer level (RTL) model of the IC.

Step 308 includes forming the integrated circuit layout.

Step 310 includes using parasitic extraction tools to generate a transistor level netlist with layout parasitics. In some embodiments, the layout parasitics may include effects from resistors and capacitors in the netlist simulation.

Step 312 includes using the extracted netlist for a signal electro-migration (SEM) analysis. In some embodiments, step 312 includes transferring the extracted netlist to a parallel architecture for SEM analysis. The parallel architecture may include master server 101m and slave servers 101s coupled through network 150. In some embodiments, step 312 includes separating IC netlist 200 into partitions 201, and separating multiple simulation tasks in computational threads across each of the different partitions 201. For example, a computational thread in cloud environment 100 may be associated with a specific partition 201. This procedure enables efficient and accurate dynamic simulation of partitions 201 (e.g., through simulation tools such as "SPICE" and the like). To separate multiple simulation tasks across each of the different partitions 201, step 312 may include preparing input data files for each of the tasks in the computational threads associated with each of partitions 201. In some embodiments, step 312 also includes combining multiple computational thread results from multiple partitions 201 into a single SEM database for the entire IC netlist 200. The single SEM database may include a single file, or a cluster of files associated with IC netlist 200, wherein a user may determine SEM characteristics of any portion of IC netlist 200. In some embodiments, step 312 may include providing an electromigration report for IC netlist 200 to the foundry. The electromigration report may include the electromigration performance of the plurality of components 211 in IC netlist 200, including expected lifetimes for components 211. The electromigration report may further include statistical analysis of the expected electromigration lifetimes of different components 211, according to multiple random fabrication variables provided by the foundry in the PDK file.

Step 314 includes providing the layout information to a foundry, to fabricate the integrated circuit. Based on the layout information, the foundry may decide to revise a device specification, such as modified operational conditions (e.g., environmental operation conditions, and the like). In some configurations, the foundry may decide to modify the IC model when certain performance specifications (e.g., SEM lifetime) fall out of an acceptable range.

Figure 4:
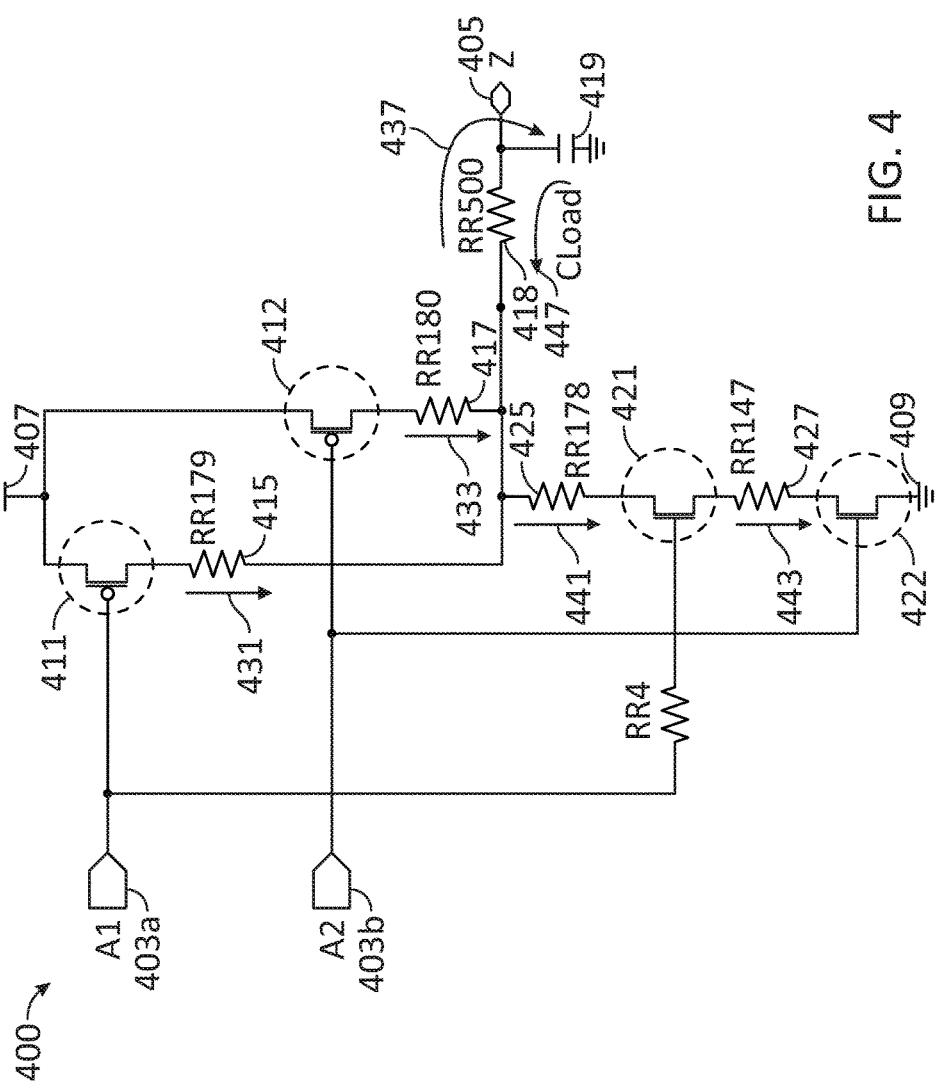
FIG. 4 illustrates an IC netlist with current flows following different stimuli through its inputs, according to some embodiments.

FIG. 4 illustrates an IC netlist 400 with current flows following different stimuli through inputs 403a ($A_1$) and 403b ($A_2$), according to some embodiments. IC netlist 400 may be at least a portion of a sub-netlist for a partition 201 of IC netlist 200. IC netlist 400 includes PMOS transistors 411 and 412, having a source terminal coupled with a high voltage supply 407 (VDD). IC netlist 400 also includes NMOS transistors 421 and 422, having a drain terminal coupled with a low voltage supply 409 (VSS, or ground). An output 405 (Z), which is coupled with a capacitor 419, provides the output signal from IC netlist 400 to an external circuit. The drain terminals of transistors 411 and 412 are loaded with resistors 415 (RR179) and 417 (RR180), respectively. Likewise, the source terminals of transistors 421 and 422 are loaded with resistors 425 (RR178) and 427 (RR147), respectively. Capacitor 419 is loaded with resistor 418 (RR500).

In some embodiments, SEM effects are most notably reflected on resistors coupled to the drain and source terminals of transistors (e.g., resistors 415, 417, 418, 419, 425 and 427). Accordingly, a simulation scheme as disclosed herein desirably selects input vector stimuli to produce high current densities flowing through each of these resistors. For example, it is desirable to stimulate a current flow 431 through resistor 415, a current flow 433 through resistor 417, and a current flow 437 through resistor 418. Likewise, it is desirable to stimulate a current flow 441 through resistor 425, a current flow 433 through resistor 427, and a current flow 447 through resistor 418. Current flow 447 flows in the opposite direction as current flow 437, through resistor 418. In this regard, in some embodiments it may be desirable to choose the input vector stimuli to produce currents flowing along either direction in the resistors. For example, it is observed that, while some SEM effects may be cancelled from current flowing in opposite directions, some SEM effects may in fact increase for currents flowing in opposite directions. Some of the SEM effects that may be enhanced by considering current flow in opposite directions include root-mean-square (RMS) current effects. For example, in some embodiments the peak current density, or the maximum current density, through an element is a factor having a strong weight in the SEM effects. More generally, SEM effects may be the result of average current flow through a circuit component 211. Therefore, input stimulus vectors may be selected to exercise all, or mostly all operational conditions of IC netlist 400. For example, in some embodiments selecting the input stimulus vector includes obtaining the most stringent operation conditions of IC netlist 400, such as the highest current densities through the different components. Duration of the current and the magnitude of the current may change in either direction.

Accordingly, it is desirable to select input stimulus vectors tracing a path from VDD 407 to output 405, thereby generating currents 431, 433, and 437. Also, it is desirable to select input stimulus vectors tracing a path from VSS 409 to output 405, thus generating currents 441, 443, and 447.

TABLE I lists at least some input vector stimuli that may be used to determine SEM effects in IC netlist 400 in an exhaustive manner.

TABLE I

| Vector | Input $A_1$ | Input $A_2$ | Resistors Coupled to Supply |
|---|---|---|---|
| I. | 0 | 0 | RR179, RR180, RR500 |
| II. | 0 | 1 | RR179, RR500 |
| III. | 1 | 0 | RR180, RR500 |
| IV. | 1 | 1 | RR178, RR147, RR500 |
|  |  |  | Resistors Validated |
| V. | 1-0-1 | 1 | RR178, RR147, RR179, RR500 |
| VI. | 1 | 1-0-1 | RR178, RR147, RR180, RR500 |
| VII. | 1-0-1 | 1-0-1 | RR178, RR147, RR179, RR180, RR500 |

In the case of stimulus vector VII ($A_1$: 1-0-1, $A_2$: 1-0-1), the use of simultaneous input switching tends to maximize output peak currents, which may be desirable for a comprehensive evaluation of SEM effects. Further, stimulus vector VII activates all resistors in IC netlist 400. Accordingly, in some embodiments stimulus vector VII may have pre-eminence over stimulus vectors I through VI, for SEM estimation. Further, in some embodiments an SEM analysis may use only stimulus vector VII to obtain a "worst case" scenario for SEM analysis at a reduced computational cost.

FIG. 5A illustrates an input vector stimulus in a combination cell configuration 500A, according to some embodiments. In some embodiments, combination cell configuration 500A includes providing an input stimulus 501a to both terminals $A_1$ 403a and $A_2$ 403b simultaneously or separately, as a single pulse (cf., input stimuli vectors I, II, III and IV). Input stimulus 501a, delay 521a, input rising slew 511a, electro-magnetic input period 531a, input dropping slew 513a. In some embodiments, input rising slew 511a and input dropping slew 513a may be the same, or similar. An output response 503a is produced at output 405 within a response time window 541a. In some embodiments, response time window 541a is approximately twice as long as electro-magnetic input period 531a.

FIG. 5B illustrates an input vector stimulus in a sequential cell configuration 500B, according to some embodiments. In some embodiments, the sequential cell configuration includes providing the signal input to both terminals $A_1$ 403a and $A_2$ 403b sequentially in time (cf., input stimuli vectors V, VI and VII). Input stimulus 501b, delay 521b, input rising slew 511b, electro-magnetic period 531b, input dropping slew 513b. In some embodiments, input rising slew 511b and input dropping slew 513b may be the same, or similar. An output response 503b is produced at 450 within a response time window 541b which may be as long as four times electro-magnetic period 531b.

Figure 6:
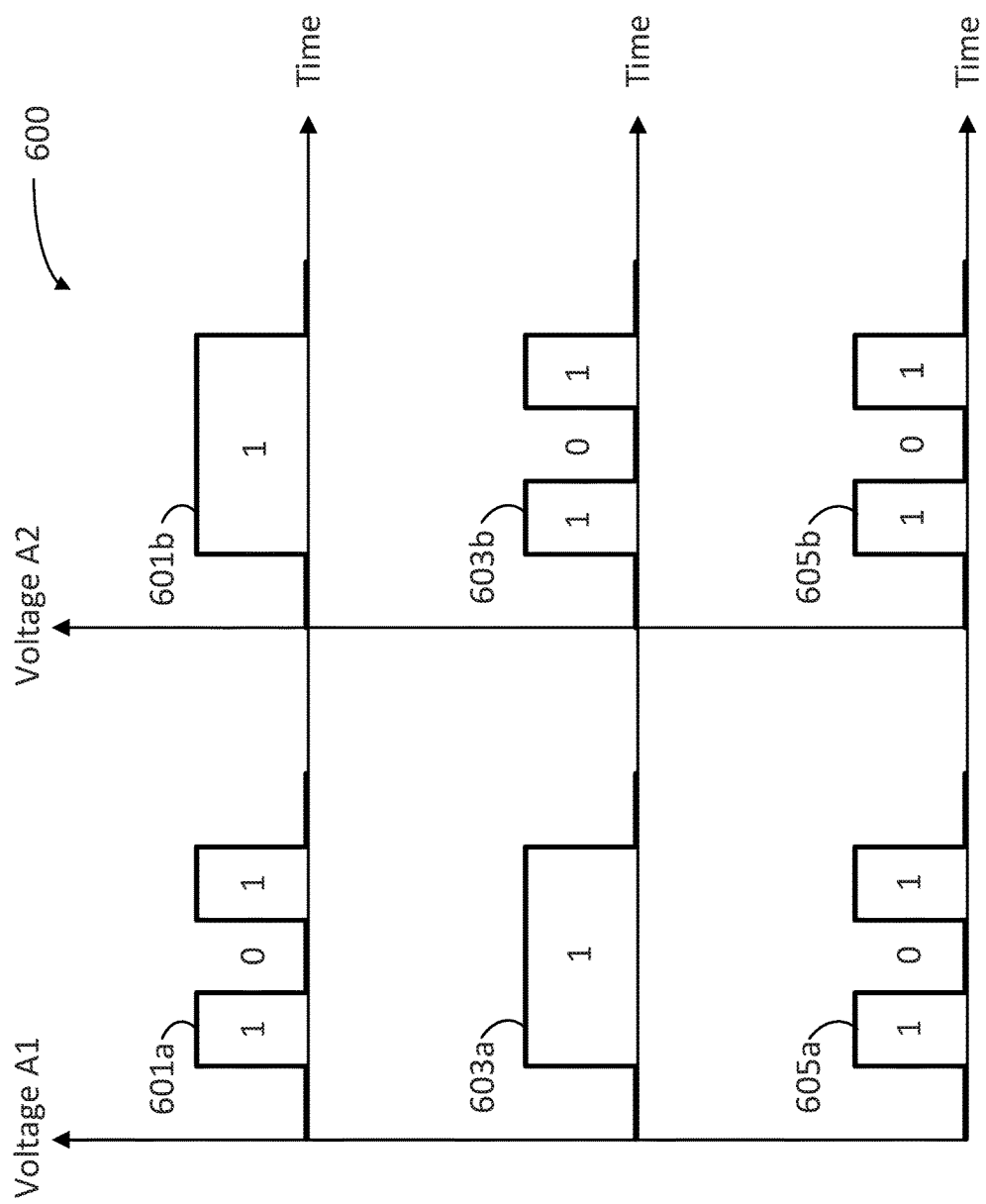
FIG. 6 is a chart illustrating input vector stimuli for SEM analysis in the IC model of FIG. 3, according to some embodiments.

FIG. 6 is a chart 600 illustrating input vector stimuli 601a, 601b (referred hereinafter to as input vector stimulus 601), 603a, 603b (referred hereinafter to as input vector stimulus 603), 605a, and 605b (referred hereinafter to as input vector stimulus 605), for SEM analysis in IC netlist 400 (cf., TABLE I), according to some embodiments. The X-axis (abscissae) in chart 600 indicates time, and the Y-axis (ordinate) indicates a voltage (e.g., VDD, VSS, or any other voltage source value).

Input vector stimulus 601 may be as input vector stimulus V, input vector stimulus 603 may be as input vector stimulus VI, and input vector stimulus 605 may be as input vector stimulus VII (cf. Table I). Segments 601a, 603a, and 605a indicate portions of input vector stimuli (V, VI, and VII, respectively) applied on $A_1$ 403a, and segments 601a, 603a, and 605a indicate portions of input vector stimuli applied on $A_2$ 403b. Accordingly, segments 601a and 601b may be simulated simultaneously, or almost simultaneously. The effect of this may be that, for at least some period of time (e.g., the two EM periods), the current density in RR 178 and RR 147 from capacitor 419 may be maximized. On the other hand, for at least one period of time, the current through RR179 and RR500 may be maximized.

Likewise, segments 603a and 603b may be simulated simultaneously, or almost simultaneously. This may result in a current through RR180 and RR500 to be maximized.

Segments 605a and 605b may also be simulated simultaneously, or almost simultaneously. When this is the case, switching on and off inputs $A_1$ 403a and $A_2$ 403b may subject resistors RR178, RR147, RR179, RR180, and RR50 to the largest current intensities due to the synchronous addition of transient effects.

Figure 7:
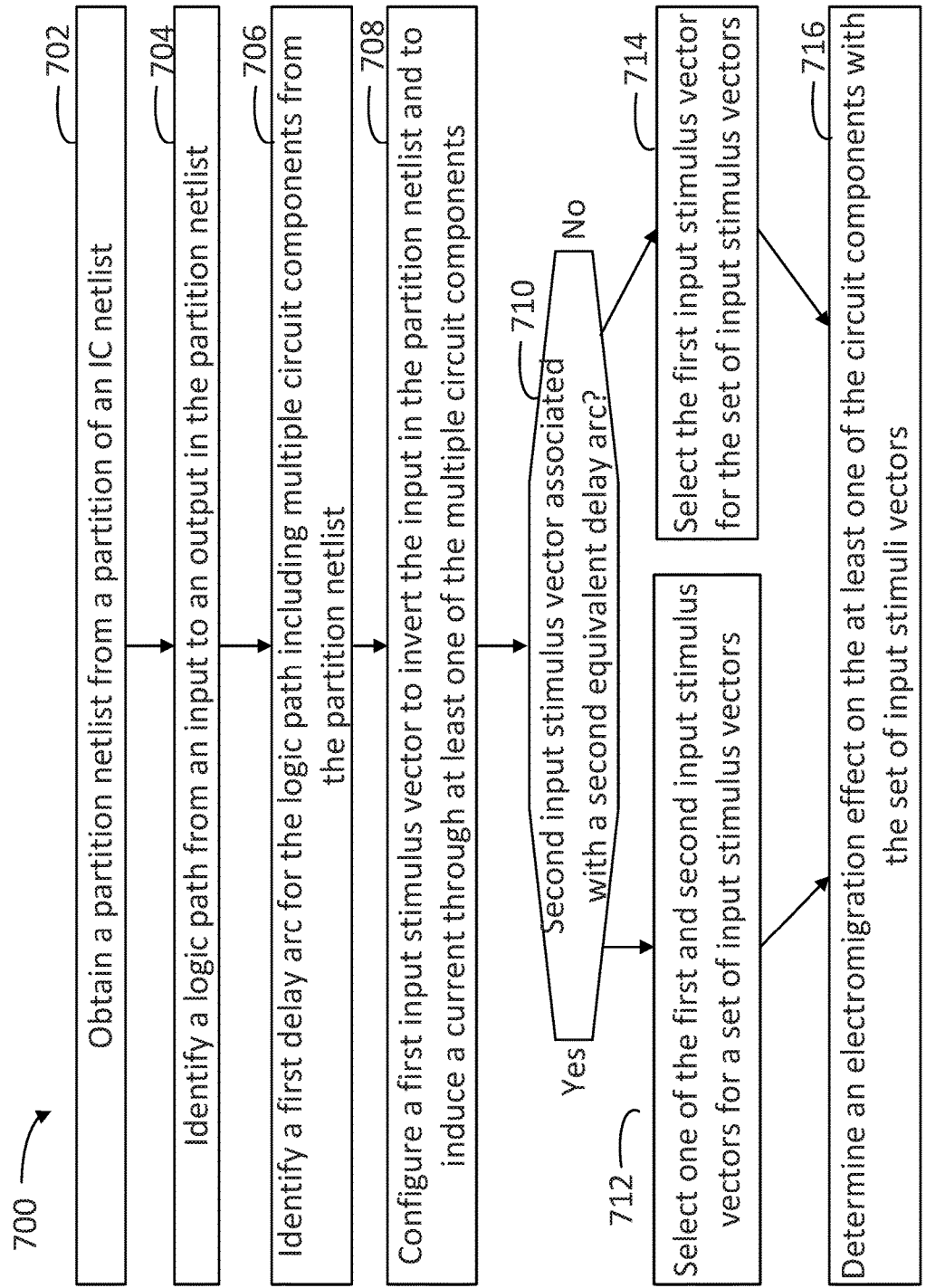
FIG. 7 illustrates a flowchart including steps to identify vector stimuli to characterize electromigration effects in an IC model, according to some embodiments.

FIG. 7 illustrates a flowchart including steps to identify vector stimuli to characterize electromigration effects in an IC netlist, according to some embodiments. At least some of the steps in method 700 may be performed by a computer having a processor executing commands stored in a memory of the computer. Further, steps as disclosed in method 700 may include retrieving, editing, and/or storing files in a database that is part of, or is communicably coupled to, the computer. Methods consistent with the present disclosure may include at least some, but not all of the steps illustrated in method 700, performed in a different sequence. Furthermore, methods consistent with the present disclosure may include at least two or more steps as in method 700 performed overlapping in time, or almost simultaneously.

In some embodiments, at least one or more of the steps in method 700 may be performed in cloud computing environment 100, wherein the computer may include servers 101, such as a master server 101m and a slave servers 101s. Accordingly, at least some of the steps illustrated in method 700 may be performed in parallel in different processors 102, following separate computational threads. For example, each of the separate computational threads may be performed by at least one of slave servers 102s in each of the applications 110s and processors 102s dedicated to the specific computational thread. Moreover, at least some of the steps in method 700 may be performed on a partition 201 of IC netlist 200. More specifically, at least some of the steps in method 700 may be performed on a sub-netlist 400 associated with any partition 201 of IC netlist 200.

Step 702 includes obtaining an input netlist from a partition of an integrated circuit netlist (e.g., partition 201 from IC netlist 200). Accordingly, in some embodiments step 702 includes selecting IC netlist 400 from partition 201 as a sub-netlist of IC netlist 200.

Step 704 includes identifying a logic path from an input (e.g., input 203 and any one of $A_1$ 403a or $A_2$ 403b) to an output (e.g., output 205 and output 405) in the partition netlist.

Step 706 includes identifying a first delay arc for the logic path, the first delay arc including multiple circuit components from the partition netlist. In some embodiments, step 706 includes assigning a value to an input slew (e.g., input slews 511 or 513) in the logic path, and to a delay (e.g., delays 521a and 521b). In some embodiments, step 706 includes identifying an arc logic using a pairwise binding of inputs for pulse generation. Accordingly, in some embodiments step 706 may include finding delay arc list equivalence between two different delay arcs from the partition netlist. For example, in some embodiments step 706 includes building a table such as Table I.

Step 708 includes configuring a first input stimulus vector to invert the input in the partition netlist. In some embodiments, step 708 includes configuring a first input stimulus vector to switch the input in the partition netlist and to induce a current through at least one of the multiple circuit components. Step 708 may include configuring the input stimulus vector with a pulse. In some embodiments, step 708 includes configuring a multi input switching arc simulation.

Step 710 includes determining whether a second input stimulus vector is associated with a second delay arc that is equivalent to the first delay arc in the logic path. Accordingly, step 710 may include determining a second delay arc that is equivalent to the first delay arc when at least one circuit component in the first delay arc is included in the second delay arc. In some embodiments, the first delay arc may be associated with a first logic path and the second delay arc may be associated with a second logic path, wherein the first and second logic paths are different.

Step 712 includes selecting one of the first and second input stimulus vectors for a set of input stimulus vectors when a second stimulus vector is associated with the second delay arc. In some embodiments, step 712 includes reducing the input stimuli vector set based on the arc list equivalence. For example, in some embodiments step 712 includes reducing the input stimuli vector set in Table I to only input stimulus vector VII, in view of the arc list of components targeted (cf., "resistors coupled to supply" column in Table I).

Step 714 includes selecting the first input stimulus vector for the set of input stimulus vectors when no second stimulus vector is associated with a second equivalent delay arc. In some embodiments, step 714 includes removing an input stimulus vector from the set of input stimulus vectors when a direct-current (DC) short is detected when the input netlist is simulated using the input stimulus vector. In some embodiments, step 714 includes reducing the input stimuli vector set based on DC short detection. For example, in some embodiments it may be found that certain input stimulus vector creates a DC short at some point, or an excess current intensity over an unintended circuit component 211 (e.g., a VDD source coupled directly to a VSS source through a low resistance wire). In such situations, it may be desirable to avoid simulation of the selected input stimulus vector because any SEM effect will be simply shadowed by melting of the wire.

Step 716 includes determining an SEM effect on the at least one of the circuit components with the set of input stimuli vectors. In some embodiments, step 716 includes selecting a set of input stimuli vectors for pulse generation, and performing an electro-magnetic simulation on the partition netlist. In some embodiments, step 716 may include optimizing the set of input stimuli vectors so as to obtain the maximum value for SEM effects in the input netlist. Further, in some embodiments step 716 may include optimizing the set of input stimuli vectors to reduce the computational cost of the simulation. For example, in some embodiments step 716 includes simulating the performance of the input netlist using an input stimulus vector such as input stimulus vector VII (cf., Table I), wherein inputs $A_1$ 401 and $A_2$ 402 are switched simultaneously, thus enhancing potential SEM effects in the input netlist.

Figure 8:
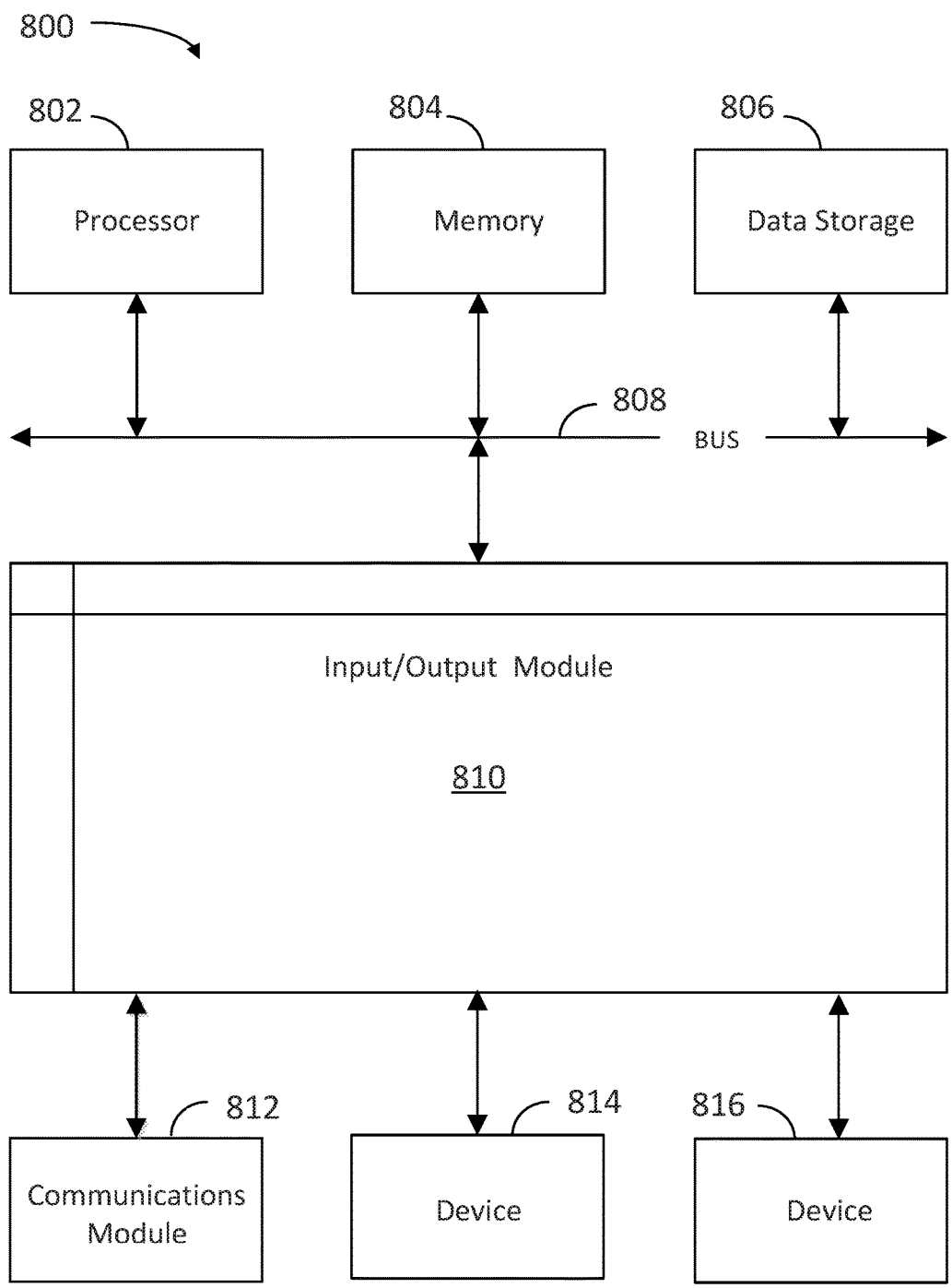
FIG. 8 is a block diagram illustrating an example computer system that includes a design tool, according to some embodiments.

FIG. 8 is a block diagram illustrating an example computer system 800 with which the methods steps and systems illustrated in FIGS. 1-7 can be implemented, according to some embodiments. In certain aspects, computer system 800 can be implemented using hardware or a combination of software and hardware, either in a dedicated server, integrated into another entity, or distributed across multiple entities.

Computer system 800 includes a bus 808 or other communication mechanism for communicating information, and a processor 802 coupled with bus 808 for processing information. By way of example, computer system 800 can be implemented with one or more processors 802. Processor 802 can be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information. In some embodiments, processor 802 may include modules and circuits configured as a 'placing' tool or engine, or a 'routing' tool or engine, to place devices and route channels in a circuit layout, respectively and as disclosed herein.

Computer system 800 includes, in addition to hardware, code that creates an execution environment for the computer program in question, e.g., code that constitutes processor firmware, a protocol stack, a database management system, an operating system, or a combination of one or more of them stored in an included memory 804, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 808 for storing information and instructions to be executed by processor 802. Processor 802 and memory 804 can be supplemented by, or incorporated in, special purpose logic circuitry.

The instructions may be stored in memory 804 and implemented in one or more computer program products, i.e., one or more modules of computer program instructions encoded on a computer readable medium for execution by, or to control the operation of, the computer system 800, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, Wirth languages, embeddable languages, and xml-based languages. Memory 604 may also be used for storing temporary variable or other intermediate information during execution of instructions to be executed by processor 802.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 800 further includes a data storage device 806 such as a magnetic disk or optical disk, coupled to bus 808 for storing information and instructions.

Computer system 800 is coupled via input/output module 810 to various devices. The input/output module 810 is any input/output module. Example input/output modules 810 include data ports such as USB ports. The input/output module 810 is configured to connect to a communications module 812. Example communications modules 812 include networking interface cards, such as Ethernet cards and modems. In certain aspects, the input/output module 810 is configured to connect to a plurality of devices, such as an input device 814 and/or an output device 816. Example input devices 814 include a keyboard and a pointing device, e.g., a mouse or a trackball, by which a user can provide input to the computer system 800. Other kinds of input devices 814 are used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Example output devices 816 include display devices, such as a LED (light emitting diode), CRT (cathode ray tube), or LCD (liquid crystal display) screen, for displaying information to the user.

Methods as disclosed herein may be performed by computer system 800 in response to processor 802 executing one or more sequences of one or more instructions contained in memory 804. Such instructions may be read into memory 804 from another machine-readable medium, such as data storage device 806. Execution of the sequence of instructions contained in main memory 804 causes processor 802 to perform the process steps described herein (e.g., as in methods 300 and 700). One or more processors in a multi-processing arrangement may also be employed to execute the sequence of instructions contained in memory 804. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., communication network 150. For example, some aspects of the subject matter described in this specification may be performed on a cloud-computing environment. Accordingly, in certain aspects a user of systems and methods as disclosed herein may perform at least some of the steps by accessing a cloud server through a network connection. Further, data files, circuit diagrams, performance specifications and the like resulting from the disclosure may be stored in a database server in the cloud-computing environment, or may be downloaded to a private storage device from the cloud-computing environment.

Computing system 800 includes servers and personal computer devices. A personal computing device and server are generally remote from each other and typically interact through a communication network. The relationship of client and server arises by virtue of computer programs running on the respective computers and having a client-server relationship to each other. Computer system 800 can be, for example, and without limitation, a desktop computer, laptop computer, or tablet computer. Computer system 800 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer readable medium" as used herein refers to any medium or media that participates in providing instructions or data to processor 802 for execution. Such a medium may take many forms, including, but not limited to, non-volatile media, volatile media, and transmission media. Non-volatile media include, for example, optical disks, magnetic disks, or flash memory, such as data storage device 806. Volatile media include dynamic memory, such as memory 804. Transmission media include coaxial cables, copper wire, and fiber optics, including the wires that comprise bus 808. Common forms of machine-readable media include, for example, floppy disks, flexible disks, hard disks, magnetic tapes, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter affecting a machine-readable propagated signal, or a combination of one or more of them.

In one aspect, a method may be an operation, an instruction, or a function and vice versa. In one aspect, a clause or a claim may be amended to include some or all of the words (e.g., instructions, operations, functions, or components) recited in one or more clauses, one or more words, one or more sentences, one or more phrases, one or more paragraphs, and/or one or more claims.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." The term "some," refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

The invention claimed is:

1. A computer-implemented method, comprising:
   obtaining, with a characterization tool and a parasitic extraction tool, a partition netlist from a partition of an integrated circuit netlist;
   identifying a logic path from an input of the partition netlist to an output of the partition netlist;
   identifying a first delay arc for the logic path, the first delay arc comprising multiple circuit components from the partition netlist;
   configuring a first input stimulus vector to invert the input in the partition netlist, at least once over a selected number of clock cycles and to induce a first current through at least one of the circuit components;
   when a second input stimulus vector is associated with a second delay arc that is equivalent to the first delay arc in the logic path, selecting one of the first or second input stimulus vectors for a set of input stimuli vectors based on whether the second delay arc induces a second current through the at least one of the circuit components, whether the first current is smaller than the second current, and whether a direction of the first current is opposite a direction of the second current; and
   determining an electromigration effect on the partition netlist with the set of input stimuli vectors.

2. The method of claim 1, wherein determining an electromigration effect on the partition netlist with the set of input stimuli vectors comprises providing a plurality of pulses in at least one of the set of input stimuli vectors to the input in the partition netlist.

3. The method of claim 1, further comprising removing an input stimulus vector from the set of input stimuli vectors when a direct-current short is detected when the input stimulus vector is fed through the input in the partition netlist.

4. The method of claim 1, wherein identifying a logic path from the input to the output comprises pairwise binding at least two input pins from the partition netlist in the logic path.

5. The method of claim 1, wherein configuring a first input stimulus vector comprises including, in the first input stimulus vector, at least two pulses for switching at least two inputs in the partition netlist simultaneously.

6. The method of claim 1, wherein configuring the first input stimulus vector comprises configuring the first input stimulus vector to induce opposite currents through the at least one of the circuit components.

7. The method of claim 1, further comprising determining that the second delay arc is equivalent to the first delay arc when at least one of the circuit components in the first delay arc is commonly shared with the second delay arc.

8. The method of claim 1, wherein configuring the first input stimulus vector comprises maximizing a current density through the at least one of the circuit components.

9. The method of claim 1, further comprising configuring the second input stimulus vector to induce a current flow in at least a second one of the circuit components.

10. The method of claim 1, further comprising identifying a second logic path from a second input to a second output in the partition netlist, and identifying a second delay arc comprising a second plurality of circuit components from the partition netlist.

11. The method of claim 1, wherein obtaining a partition netlist from a partition of an integrated circuit netlist further comprises generating a register transfer level model of an integrated circuit, and transferring the register transfer level model to a parallel architecture to evaluate an electromagnetic performance of the integrated circuit.

12. A system, comprising:
a memory, storing instructions;
a characterization tool;
a parasitic extraction tool; and
at least one processor that executes the instructions to:
obtain, with the characterization tool and the parasitic extraction tool, a partition netlist from a partition of an integrated circuit netlist;
identify a logic path from an input of the partition netlist to an output of the partition netlist;
identify a first delay arc for the logic path, the first delay arc comprising multiple circuit components from the partition netlist;
configure a first input stimulus vector to invert the input in the partition netlist at least once over a selected number of clock cycles and to induce a first current through at least one of the circuit components;
when a second input stimulus vector is associated with a second delay arc that is equivalent to the first delay arc in the logic path, select one of the first or second input stimulus vectors for a set of input stimuli vectors based on whether the second delay arc induces a second current through the at least one of the circuit components, whether the first current is smaller than the second current, and whether a direction of the first current is opposite a direction of the second current; and
determine an electromigration effect on the partition netlist with the set of input stimuli vectors.

13. The system of claim 12, wherein the at least one processor comprises a master processor and a slave processor coupled through a network connection, wherein the master processor is configured to provide the slave processor with an initialization routine to execute at least one portion of the instructions, and to control an execution of the at least one portion of the instructions by the slave processor.

14. The system of claim 12, wherein the at least one processor comprises a first processor partially executing at least one portion of the instructions in a first computational thread and a second processor partially performing at least a second portion of the instructions in a second computational thread.

15. The system of claim 12, wherein the at least one processor comprises a first processor configured to identify a first arc delay for the logic path in a first computational thread, and a second processor configured to identify the second delay arc in a second computational thread.

16. The system of claim 12, wherein the memory comprises a first application including instructions to identify a first logic path from a first input to a first output in the partition netlist in a first computational thread, and a second application including instructions to identify a second logic path from a second input to a second output in the partition netlist in a second computational thread.

17. The system of claim 12, wherein to configure the first input stimulus vector the at least one processor executes instructions to include, in the first input stimulus vector, at least two pulses for switching at least two inputs in the partition netlist simultaneously.

18. The system of claim 12, wherein to configure the first input stimulus vector the at least one processor executes instructions to configure the first input stimulus vector to induce opposite currents through the at least one of the circuit components.

19. A non-transitory, machine-readable medium comprising instructions stored in a memory which, when executed by a processor cause a computer to perform steps in a method, the method comprising:
obtaining, with a characterization tool and a parasitic extraction tool, a partition netlist from a partition of an integrated circuit netlist;
identifying a logic path from an input of the partition netlist to an output of the partition netlist;
identifying a first delay arc for the logic path, the first delay arc comprising multiple circuit components from the partition netlist;
configuring a first input stimulus vector to invert the input in the partition netlist, at least once over a selected number of clock cycles and to induce a first current through at least one of the circuit components;
when a second input stimulus vector is associated with a second delay arc that is equivalent to the first delay arc in the logic path, selecting one of the first and second input stimulus vectors for a set of input stimuli vectors based on whether the second delay arc induces a second current through the at least one of the circuit components, whether the first current is smaller than the second current, and whether a direction of the first current is opposite a direction of the second current; and
determining an electromigration effect on the partition netlist with the set of input stimuli vectors.

20. The non-transitory, computer readable medium of claim 19, wherein the processor comprises a master processor and a slave processor coupled through a network connection, wherein the master processor is configured to provide the slave processor with an initialization routine to perform at least one of the steps in the method of claim 19, and to control an execution of the at least one of the steps by the slave processor.

* * * * *